(12) United States Patent
Pinkney

(10) Patent No.: US 11,234,493 B2
(45) Date of Patent: Feb. 1, 2022

(54) SEAT HARNESS BUCKLE SUPPORT

(71) Applicant: Kevin Omar Pinkney, Marietta, GA (US)

(72) Inventor: Kevin Omar Pinkney, Marietta, GA (US)

( * ) Notice: Subject to any disclaimer, the term of this patent is extended or adjusted under 35 U.S.C. 154(b) by 0 days.

(21) Appl. No.: 16/819,617

(22) Filed: Mar. 16, 2020

(65) Prior Publication Data

US 2021/0282507 A1    Sep. 16, 2021

(51) Int. Cl.
*B60R 22/18* (2006.01)
*A44B 11/25* (2006.01)
*B60R 22/26* (2006.01)

(52) U.S. Cl.
CPC .......... *A44B 11/2503* (2013.01); *B60R 22/26* (2013.01); *B60R 2022/1806* (2013.01)

(58) Field of Classification Search
CPC ................ A44B 11/2503; B60R 22/26; B60R 2022/1806; B60R 2022/1818; B60R 2022/1843
See application file for complete search history.

(56) References Cited

U.S. PATENT DOCUMENTS

| | | | | |
|---|---|---|---|---|
| 4,482,187 A * | 11/1984 | Nagashima | ........... | B60R 22/023 297/468 |
| 5,984,419 A * | 11/1999 | Partington | ........... | B60N 2/0232 297/216.13 |
| 6,428,106 B1 * | 8/2002 | Andersson | .............. | B60R 22/26 297/483 |
| 7,314,235 B2 * | 1/2008 | Downey | ............... | B60R 22/024 280/808 |
| 7,516,711 B2 * | 4/2009 | Messner | ................ | B60R 22/12 112/470.33 |
| 7,566,075 B2 * | 7/2009 | Latour | .................... | B60R 22/18 280/808 |
| 7,635,167 B2 * | 12/2009 | Okazaki | ................. | B60N 2/688 280/808 |
| 8,016,318 B2 * | 9/2011 | Nezaki | .................... | B60N 2/688 280/733 |
| 9,718,435 B2 * | 8/2017 | Harada | .............. | A44B 11/2546 |
| 10,183,647 B2 * | 1/2019 | Ishikawa | ................... | B60N 2/70 |
| 10,196,033 B2 * | 2/2019 | Loew | ....................... | B60R 22/26 |
| 2003/0160498 A1 * | 8/2003 | Boelstler | ................. | B60R 22/26 297/483 |
| 2019/0001922 A1 * | 1/2019 | Wang | ..................... | B60R 22/28 |

* cited by examiner

*Primary Examiner* — Philip F Gabler
(74) *Attorney, Agent, or Firm* — Dunlap Bennett & Ludwig, PLLC

(57) ABSTRACT

A seat buckle support includes a base having a thin profile with a width and a length each substantially greater than a depth. The base further includes an inner edge defining an opening. An elongated neck made of a flexible and resilient material includes a proximal end extending from an upper surface of the base. The elongated neck includes a bend adjacent the distal end which disposes the elongated neck at an angle relative to the upper surface. The inner surface of the elongated neck defines a channel running from the distal end to the proximal end. An entrance to the channel aligns with the opening at the upper surface. A seat buckle strap fits through the opening and the channel so that the elongated neck supports the buckle away from the car seat, preventing an individual from sitting on the buckle.

11 Claims, 6 Drawing Sheets

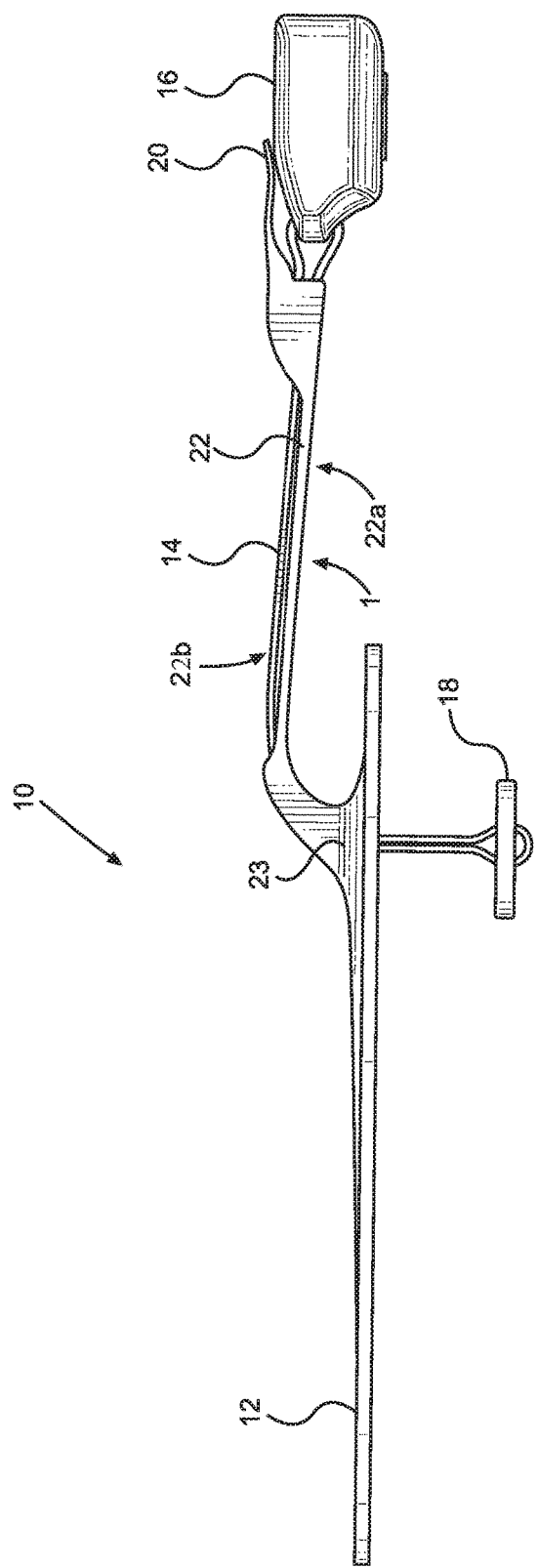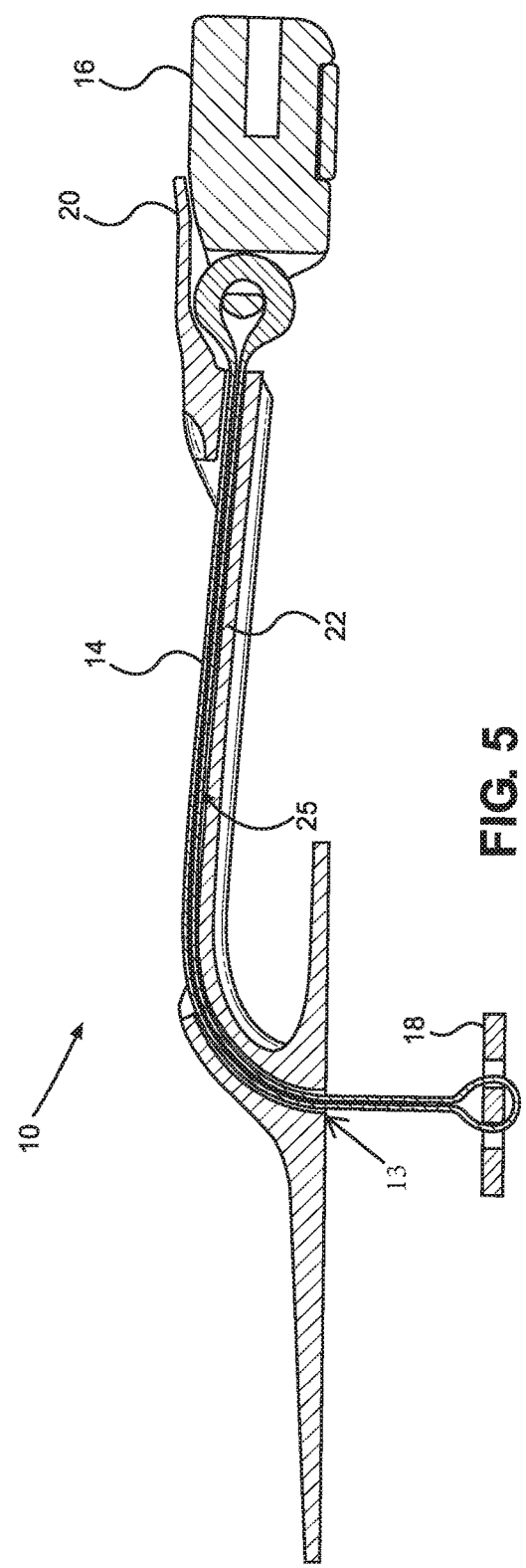

SEAT HARNESS BUCKLE SUPPORT

BACKGROUND OF THE INVENTION

The present invention relates to seat harnesses and, more particularly, to a seat harness buckle support that directs the buckle away from the seat.

A five-point harness is a form of seat belt that contains five straps that are typically mounted to a child's car seat, child's Stroller, child's high chair, car frame, motor vehicle driver's seat, and aircraft pilot/copilot seats. The five-point harness is preferred as a safety mechanism for its high amount of safety compared to other designs. The five-point harness includes five straps. Two are located at the shoulders, two at the hips, and one at the crotch that all come to connect to a buckle release mechanism.

The buckle of the five-point harness is attached to the crotch strap. Because of the location of the buckle, the buckle may rest on the seat when not in use. When someone sits down on the seat, it is common to sit on the buckle, which requires the person to either stand up or pull the buckle from underneath their buttocks.

As can be seen, there is a need for a seat harness buckle support that directs the buckle away from the seat.

SUMMARY OF THE INVENTION

In one aspect of the present invention, a seat buckle support comprises: a base comprising a thin profile having a width and a length each substantially greater than a depth, and further comprising an upper surface, a lower surface, and an inner edge defining an opening through the upper surface and the lower surface; and an elongated neck made of a flexible and resilient material and comprising a proximal end extending from the upper surface of the base and a distal end opposite the proximal end, wherein the elongated neck comprises a bend adjacent the distal end and disposing the elongated neck at an angle relative to the upper surface, and an inner surface of the elongated neck defines a channel running from the distal end to the proximal end, wherein an entrance to the channel aligns with the opening at the upper surface, the opening and the channel sized to fit a seat buckle strap therethrough.

In another aspect of the present invention, a method of supporting a seat buckle strap comprises steps of: providing a support comprising: a base comprising a thin profile having a width and a length each substantially greater than a depth, and further comprising an upper surface, a lower surface, and an inner edge defining an opening through the upper surface and the lower surface; and an elongated neck made of a flexible and resilient material and comprising a proximal end extending from the upper surface of the base and a distal end opposite the proximal end, wherein the elongated neck comprises a bend adjacent the distal end and disposing the elongated neck at an angle relative to the upper surface, and an inner surface of the elongated neck defines a channel running from the distal end to the proximal end, wherein an entrance to the channel aligns with the opening at the upper surface; placing the lower surface of the base on a seat portion of a car seat; and running a strap of a buckle through the opening base and the channel of the elongated neck.

These and other features, aspects and advantages of the present invention will become better understood with reference to the following drawings, description and claims.

BRIEF DESCRIPTION OF THE DRAWINGS

FIG. 4 is a side view of an embodiment of the present invention;

FIG. 5 is a cross sectional view of an embodiment of the present invention;

DETAILED DESCRIPTION OF THE INVENTION

Figure 1:
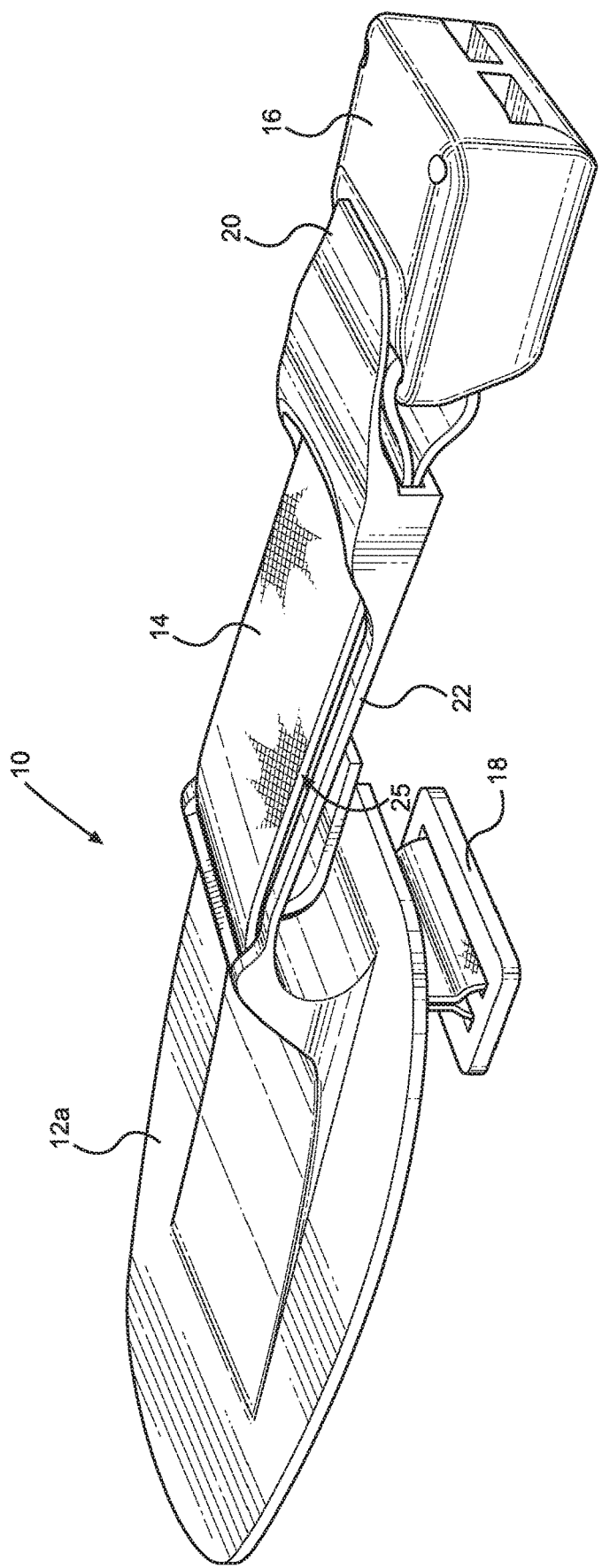
FIG. 1 is a perspective view of an embodiment of the present invention.
Figure 2:
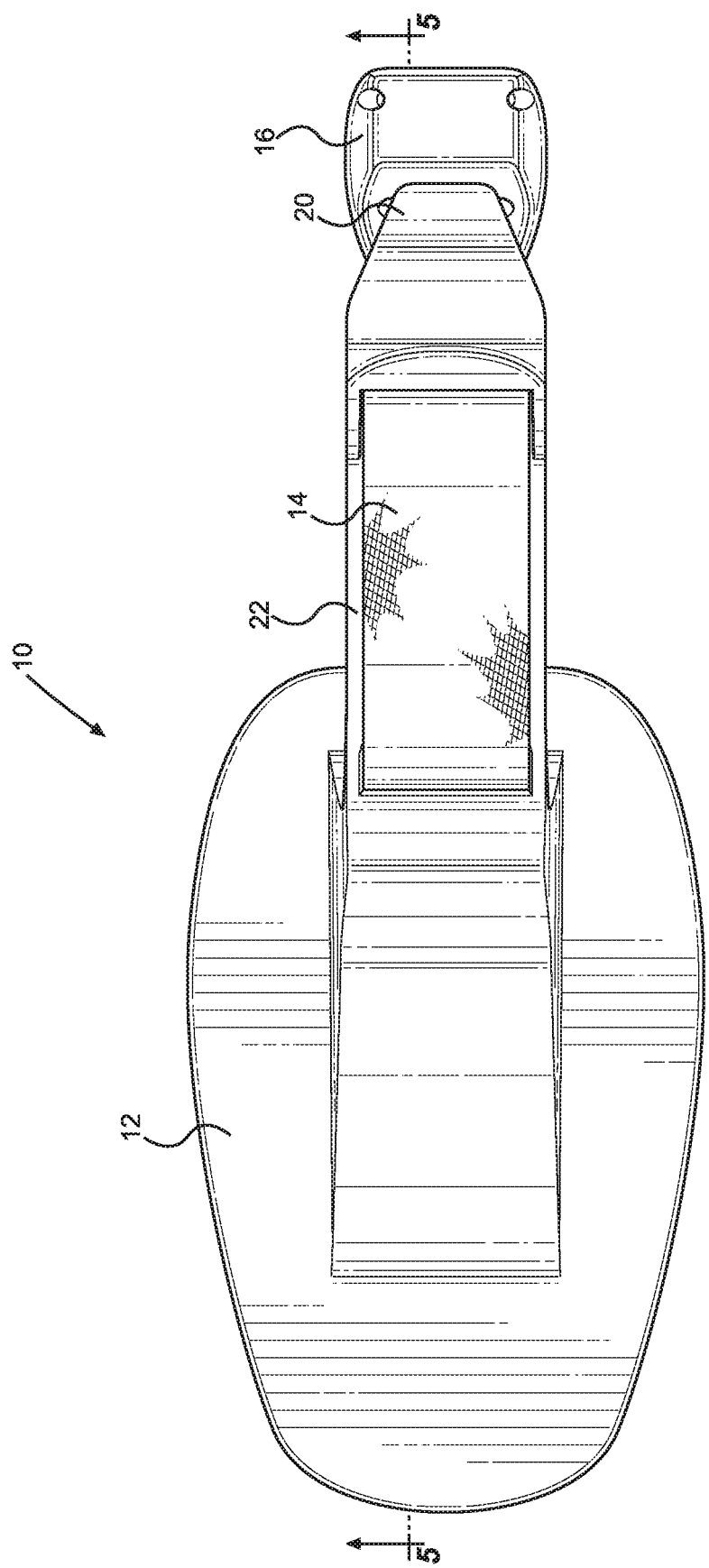
FIG. 2 is a top view of an embodiment of the present invention.
Figure 3:
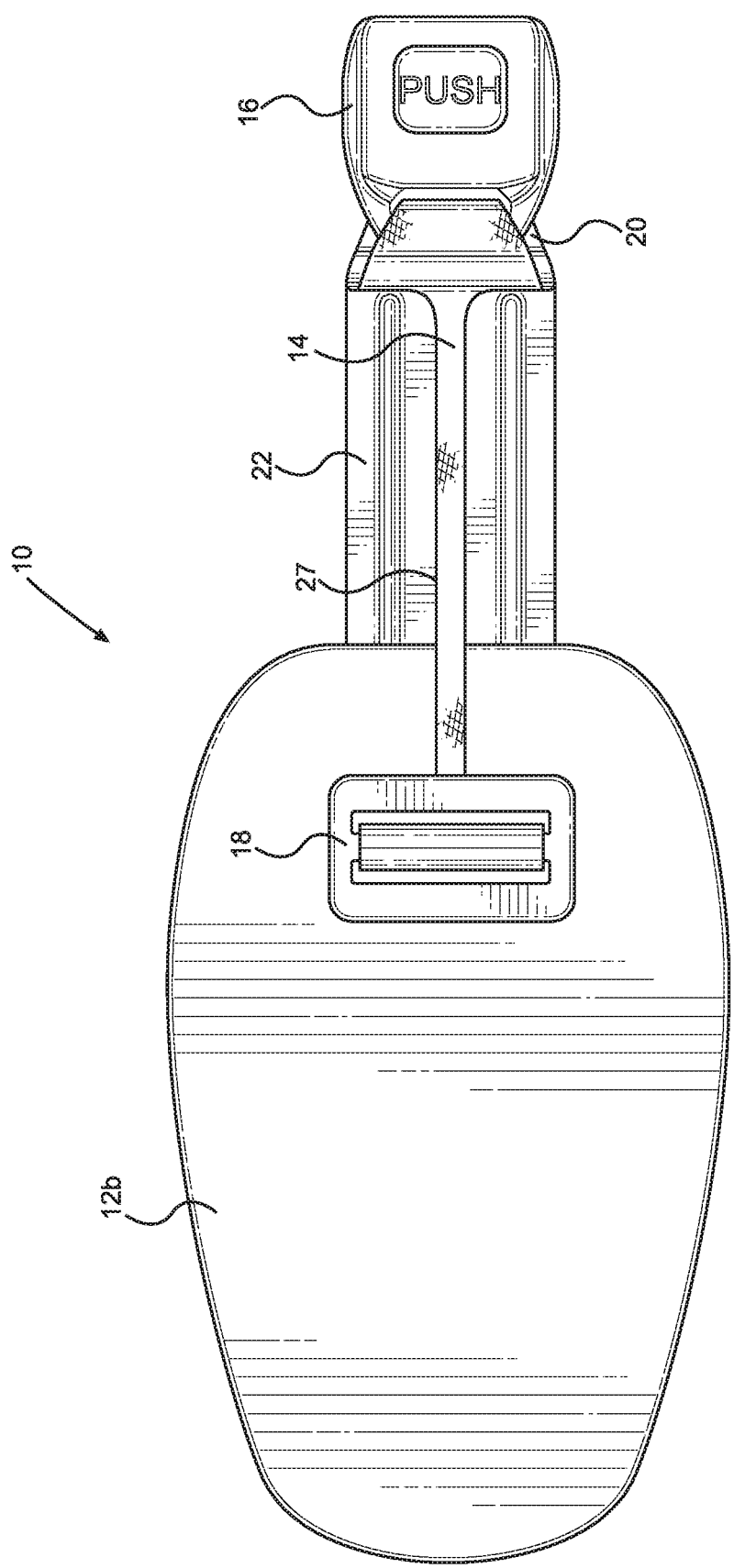
FIG. 3 is a bottom view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a device used to control the position of the lower center buckle/push button buckle and belt of a five-point harness seat belt system when disengaged. The present invention includes an elongated neck that returns the lower belt and buckle/push button buckle to a hassle-free position when disengaged.

Referring to FIGS. 1 through 5, the present invention includes a seat buckle support 10. The seat buckle support 10 includes a base 12 having a thin profile with a width and a length each substantially greater than a depth. The base 12 further includes an upper surface 12a, a lower surface 12b, and an inner edge defining an opening 13 through the upper surface 12a and the lower surface 12b. An elongated neck 22 made of a flexible and resilient material includes a proximal end extending from the upper surface 12a of the base 10 and a distal end opposite the proximal end. The elongated neck 22 includes a bend 23 adjacent the distal end which disposes the elongated neck 22 at an angle relative to the upper surface 12a. The inner surface of the elongated neck 22 defines a channel 25 running from the distal end to the proximal end. An entrance to the channel 25 aligns with the opening 13 at the upper surface 12a. A seat buckle strap 14 fits through the opening 13 and the channel 25 so that the elongated neck 22 supports the buckle 16 away from the car seat, preventing an individual from sitting on the buckle 16. A metal stop 18 fits beneath a cushion of the seat and is attached to the seat buckle strap 14, which prevents the seat buckle strap 14 from being removed from the seat.

The flexible and resilient material of the present invention may include thermoplastics, thermosetting plastics, rubbers, and the like. The bend 23 of the elongated neck 22 disposes the seat belt strap 14 and the buckle 16 away from the seat. The bend 23 may dispose the elongated neck 22 at an angle relative to the upper surface from greater than 90 degrees up to 200 degrees. The elongated neck 22 may further include an inner side 22a facing the base 12 and an outer side 22b facing away from the base 12. A flexible tip 20 extends from the distal end on the outer side 22b of the elongated neck 16. The flexible tip 20 keeps the whole buckle assembly uniform when not in use. A slot 27 runs from an edge of the base 10 to the opening 13 and further running along a length of the inner side 22a of the elongated neck 22. The slot 27 defines a seat buckle strap entrance into the opening 13 and the channel 25.

A method of supporting a seat buckle strap 14 may include the flowing. Provide the support 10 described above. Place the lower surface 12b of the base 10 on a seat portion of a car seat. Place the seat buckle strap 14 through the slot 27 and into the opening 13 and the channel 25. The elongated neck 22 supports the seat buckle strap 14 and the seat buckle 16 away from the seat.

Figure 6:
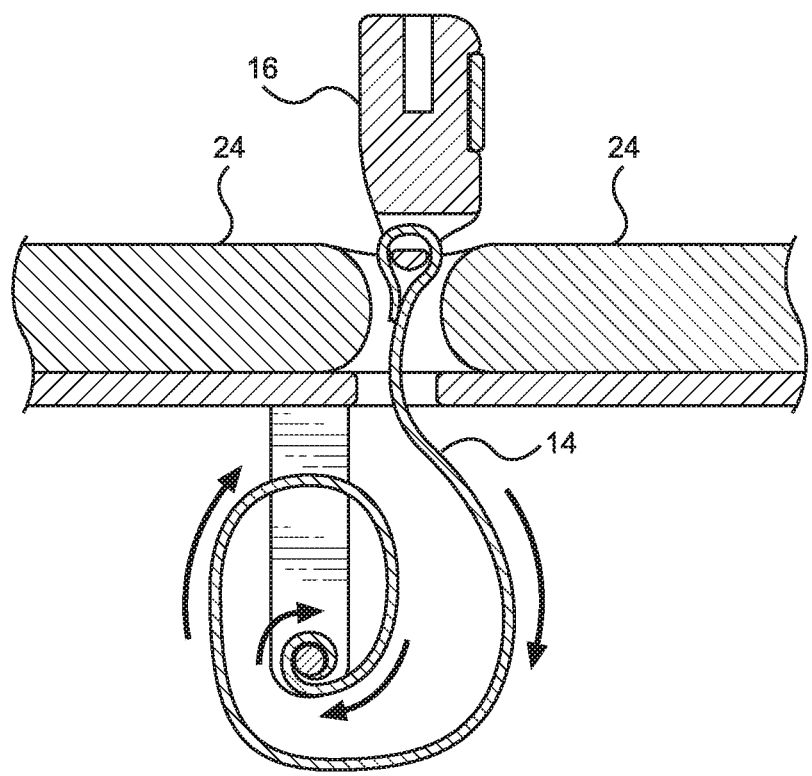
FIG. 6 is a cross sectional view of an alternative embodiment of the present invention.

FIG. 6 illustrates an alternate embodiment of the present invention. In such embodiments, an end of the seat buckle strap 14 is coupled to a spring wound spindle. The spring wound spindle biases the seat buckle strap 14 to wind around the spring wound spindle. This keeps the seat buckle 16 against a cushion 24 of the car seat. When a user is ready to buckle up, the user may pull the buckle 16 upward against the bias of the spring wound spindle and clip the latch into the buckle 16.

Figure 7:
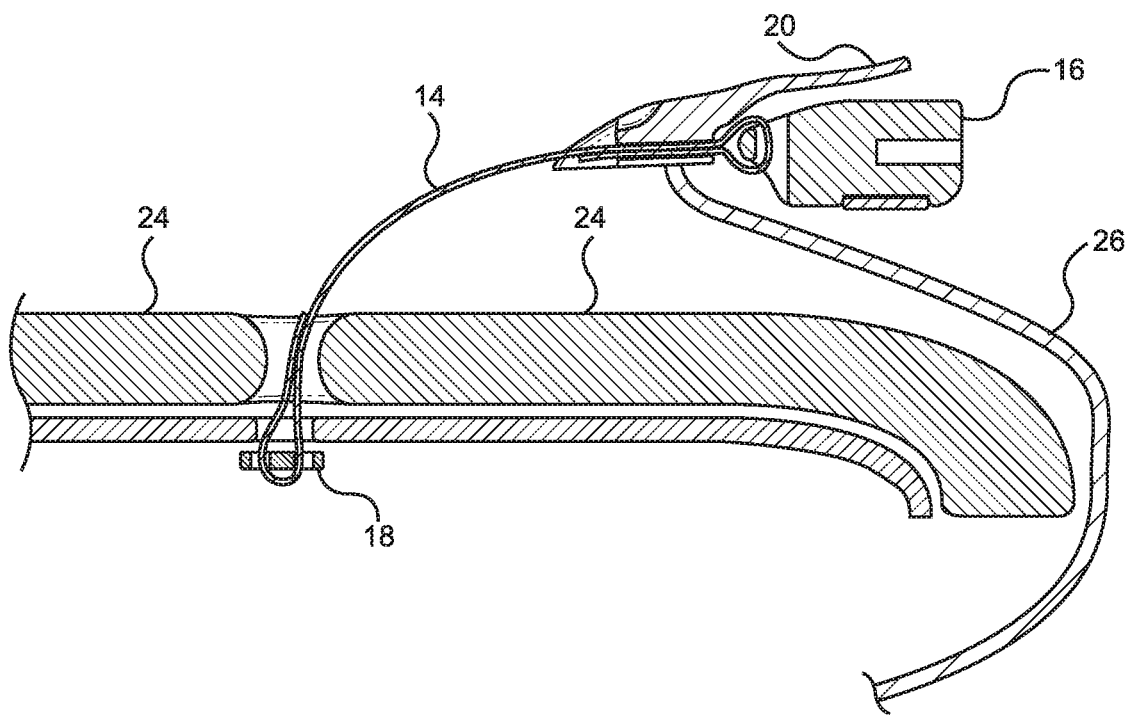
FIG. 7 is a cross sectional view of an alternative embodiment of the present invention.

FIG. 7 illustrates an alternative embodiment of the present invention. In such embodiments, an elastic band 26 may be coupled to the buckle 16 by the flexible tip 20. For example, the elastic band 26 may be coupled to the flexible tip 20 by an adhesive. The elastic band 26 is secured in front of and below the seat cushion 24, thereby biasing the buckle 16 away from the seat. The elastic band 26 may be releasably coupled by a hook and loop fastener (VELCRO™). When a user is ready to buckle up, the user may pull the buckle 16 upward against the bias of the elastic band 26 and clip the latch into the buckle 16.

Figure 8:
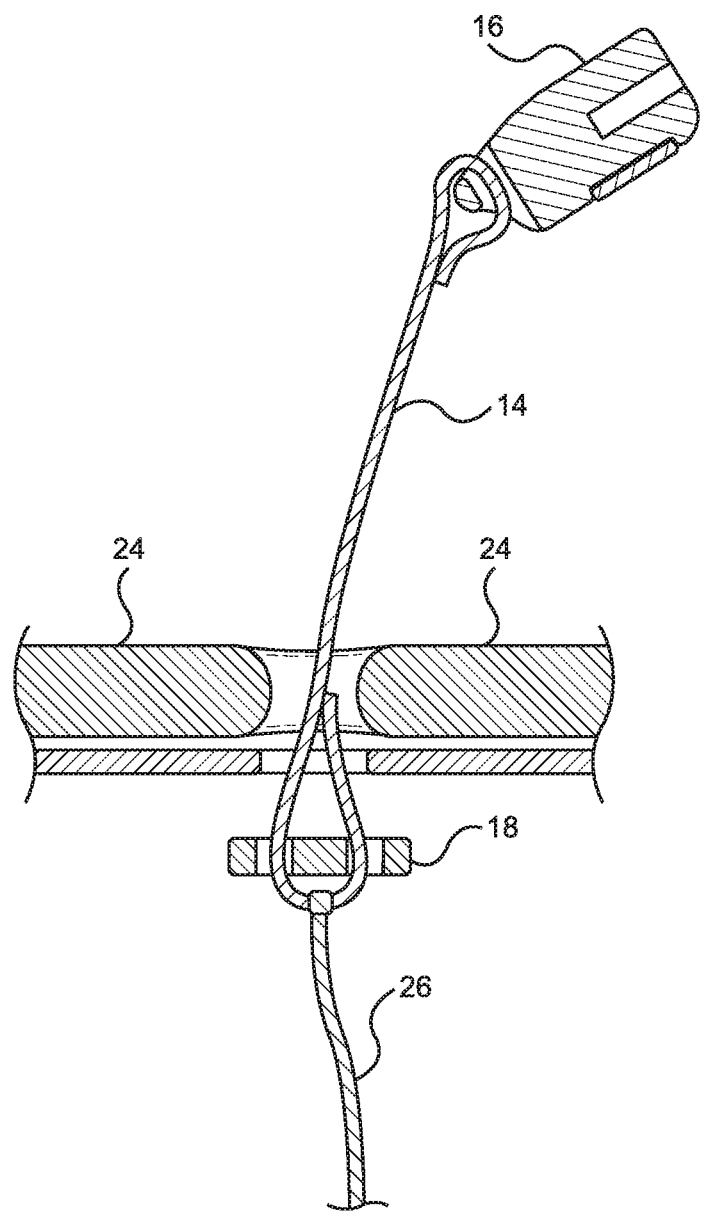
FIG. 8 is a cross sectional view of an alternative embodiment of the present invention.

FIG. 8 illustrates an alternative embodiment of the present invention. In such embodiments, an elastic band 26 may be coupled to the seat buckle strap 14 beneath the cushion 24. The elastic band 26 pulls the buckle 16 downward and away from the seat. When a user is ready to buckle up, the user may pull the buckle 16 upward against the bias of the elastic band 26 and clip the latch into the buckle 16.

It should be understood, of course, that the foregoing relates to exemplary embodiments of the invention and that modifications may be made without departing from the spirit and scope of the invention as set forth in the following claims.

What is claimed is:

1. A seat buckle support comprising:
a base comprising a base width and a base length each substantially greater than a base depth, and further comprising an upper surface, a lower surface, and an inner edge defining an opening through the upper surface and the lower surface, wherein a longitudinal length of the lower surface comprises, consecutively, a proximal distance, an entrance distance of the opening, and a distal distance, wherein the proximal distance and the distal distance are each greater than the entrance distance; and
an elongated neck comprising a proximal end extending from the upper surface of the base and a distal end opposite the proximal end, wherein the elongated neck comprises a bend adjacent the proximal end and disposing the elongated neck at an angle relative to the upper surface, and an inner surface of the elongated neck defines a channel running from the distal end to the proximal end, wherein an entrance to the channel aligns with the opening at the upper surface, the opening and the channel sized to fit a seat buckle strap therethrough.

2. The seat buckle support of claim 1, wherein the bend disposes the elongated neck at an angle relative to the upper surface from greater than 90 degrees up to 200 degrees.

3. The seat buckle support of claim 1, wherein the elongated neck comprises an inner side facing the base and an outer side facing away from the base.

4. The seat buckle of claim 3, further comprising a flexible tip extending from the distal end on the outer side of the elongated neck.

5. The seat buckle of claim 3, further comprising a slot running from an edge of the base to the opening and further running along a length of the inner side of the elongated neck and defining a seat buckle strap entrance into the opening and the channel.

6. A method of supporting a seat buckle strap comprising steps of:
providing a support comprising:
a base comprising a base width and a base length each substantially greater than a base depth, and further comprising an upper surface, a lower surface, and an inner edge defining an opening through the upper surface and the lower surface, wherein a longitudinal length of the lower surface comprises, consecutively, a proximal distance, an entrance distance of the opening, and a distal distance, wherein the proximal distance and the distal distance are each greater than the entrance distance; and
an elongated neck made of a flexible and resilient material and comprising a proximal end extending from the upper surface of the base and a distal end opposite the proximal end, wherein the elongated neck comprises a bend adjacent the proximal end and disposing the elongated neck at an angle relative to the upper surface, and an inner surface of the elongated neck defines a channel running from the distal end to the proximal end, wherein an entrance to the channel aligns with the opening at the upper surface;
placing the lower surface of the base on a seat portion of a car seat; and
running a strap of a buckle through the opening base and the channel of the elongated neck.

7. The method of claim 6, wherein the bend disposes the elongated neck at an angle relative to the upper surface from greater than 90 degrees up to 200 degrees.

8. The method of claim 6, wherein the elongated neck comprises an inner side facing the base and an outer side facing away from the base.

9. The method of claim 8, further comprising a flexible tip extending from the distal end on the outer side of the elongated neck, wherein the buckle is adjacent the flexible tip.

10. The method of claim 8, wherein the support further comprises a slot running from an edge of the base to the opening and further running along a length of the inner side of the elongated neck and defining a seat buckle strap entrance into the opening and the channel, wherein the strap is placed within the opening and the channel through the slot.

11. The seat buckle support of claim 1, wherein the lower surface is substantially a solid plane.

* * * * *